Aug. 7, 1934.     G. GAIDIES ET AL     1,968,822
GASEOUS ELECTRIC DISCHARGE DEVICE
Original Filed Jan. 7, 1932
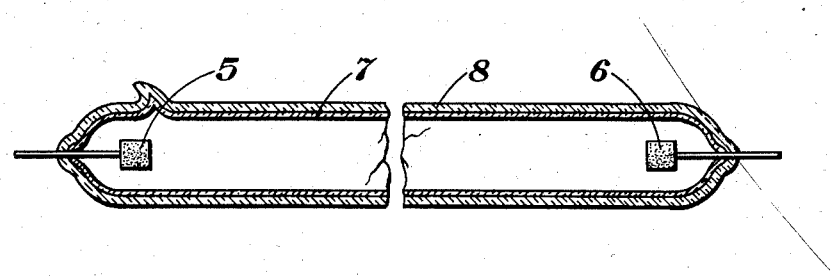
INVENTORS
Georg Gaidies
Martin Reger
BY
ATTORNEY Patented Aug. 7, 1934

1,968,822

UNITED STATES PATENT OFFICE

1,968,822
GASEOUS ELECTRIC DISCHARGE DEVICE

Georg Gaidies, Berlin-Pankow, and Martin Reger, Berlin, Germany, assignors to General Electric Company, a corporation of New York Application January 7, 1932, Serial No. 585,348. Renewed October 24, 1933. In Germany January 17, 1931

7 Claims. (Cl. 176—122)

The present invention relates to gaseous electric discharge devices generally and more particularly the invention relates to such devices in which a metal vapor is used as the entire gaseous content or as a component of the gaseous content.

The object of the invention is to provide an electric discharge device the gaseous content of which consists wholly, or in part of magnesium metal vapor. Another object of the invention is to provide such a device of great efficiency and having a long operating life. A further object of the invention is to provide a magnesium vapor filled electric discharge device useful as a lamp and as an ultra-violet generator. Still further objects and advantages attaching to the device and to its use and operation will be apparent to those skilled in the art from the following particular description.

It is well known in the art that a gaseous electric discharge device having a filling of alkali metal vapor and particularly sodium and cadmium vapor is a very efficient light source; however, it is also well known in the art that a container for such a device made of the customary commercial glasses becomes blackened after a short period of operation due to the chemical action of the alkali metal vapor on the glass walls of the container, this being true even with a quartz container. In co-pending application, Serial No. 470,436, filed July 24, 1930, being the invention of Georg Gaidies and Marcello Pirani, a glass is disclosed which is chemically stable in the presence of alkali metal vapors and particularly sodium vapor, and in co-pending application, Serial No. 510,222, filed January 22, 1931, being the invention of Marcello Pirani, Martin Reger and Georg Gaidies, a glass is disclosed which is chemically stable in the presence of alkali metal vapors and particularly cadmium vapor, such glasses being boro-silicate glasses containing not more than 50% silicic acid besides a considerable share of boric acid and the usual glass forms, or bases such as alkalies, alkali earths and aluminium oxide. It has hitherto been thought impossible to use a container made of such glasses for an electric discharge device containing a filling of magnesium vapor due to the necessary alkali content of such glasses and due to the fact that magnesium vapor is so active chemically that it has been used to separate alkali metals from their oxides. We have discovered and demonstrated, however, that such thought is erroneous and that an electric discharge device having a container made of the aforementioned glasses and having a filling of magnesium vapor shows no appreciable blackening of the walls of the container even after an operating life of several thousand hours. This discovery makes available for use in the arts generally and for the first time the intense green light emitted by magnesium vapor when excited to luminescence by an electric discharge. Magnesium vapor is also rich in ultra-violet radiations and an electric discharge device having a filling of magnesium vapor is a very efficient ultra-violet generator.

In the drawing accompanying and forming part of this specification an embodiment of the invention is shown in a sectional side elevational view.

Referring to the drawing the new and novel gaseous electric discharge device comprises a double-walled container 7, 8 having electrodes 5 and 6 sealed therein at each end thereof. Said container has a filling consisting wholly of magnesium vapor or of a mixture of magnesium vapor and a starting gas, such as for example, a rare gas as argon, krypton, xenon, etc. Inner wall 7 of said container 7, 8 is made of the boro-silicate glass such as that, for example, disclosed in co-pending application, Serial No. 470,436, filed July 24, 1930 and being the invention of Georg Gaidies and Marcello Pirani, and the outer wall 8 is made of the usual commercial glasses. This structure is advisable since the boro-silicate glass is slightly hygroscopic. I have found that the boro-silicate glass composing inner wall 7 transmits ultra-violet radiations satisfactorily if it is used in a very thin sheet, therefore when it is desired to use a magnesium vapor filled electric discharge device as an ultra-violet generator it is advisable that inner wall 7 should not exceed 0.3 mm. in thickness, and outer wall 7 should, of course, be made of a glass which transmits ultra-violet radiations such as quartz or Uviol glass. Outer wall 8 is necessary in this instance to give structural strength to the container 7, 8 as a container consisting of a thin glass is difficult to make and is structurally weak.

The boro-silicate glass of inner wall 7 is applied in a thin coating to the interior wall of the container 8 which transmits ultra-violet radiations. Electrodes 5 and 6 are sintered, mixed oxide and metal electrodes such as those disclosed in co-pending applications, Serial No. 377,044, filed July 9, 1929, being the invention of Marcello Pirani and Hans Ewest and Serial No. 447,051, filed April 24, 1930, being the invention of Georg Gaidies and Marcello Pirani, or any other electrodes chemically resistant to magnesium vapor may be used as desired.

While we have shown and described a particular embodiment of our invention it will be understood that we contemplate that numerous substitutions, modifications, and changes in the form and details of the device may be made by those skilled in the art without departure from the broad spirit and scope of the invention, for example, the inner wall 7 may be separated from the outer wall 8 by a space and said space may be evacuated to decrease the radiation of heat from said device to prevent the condensation of said magnesium vapor during the operation of the device or said outer container may be of heat absorbing glass for the same purpose or both structures may be used as desired and the inner layer 7 may be fused onto the outer layer 8 as a glaze.

What we claim as new and desire to secure by Letters Patent of the United States, is,—

1. An electric discharge device comprising in combination a container, electrodes sealed therein, a filling of magnesium vapor therein and a surface comprising a glass consisting of the usual glass bases as alkalies, alkali earths and aluminium oxide mixed with not more than 50% silicic acid interposed between the filling of magnesium vapor and said container.

2. An electric lamp comprising in combination a container, electrodes sealed therein, a filling of magnesium vapor therein and a surface comprising a glass consisting of the usual glass bases as alkalies, alkali earths and aluminium oxide mixed with not more than 50% silicic acid interposed between the filling of magnesium vapor and said container.

3. An ultra-violet generator comprising in combination a container, electrodes sealed therein, a filling of magnesium vapor therein and a surface comprising a glass consisting of the usual glass bases as alkalies, alkali earths and aluminium oxide mixed with not more than 50% silicic acid interposed between the filling of magnesium vapor and said container.

4. An electric discharge device comprising in combination a container, electrodes sealed therein, a filling of magnesium vapor therein and a surface comprising an inert glass interposed between the filling of magnesium vapor and said container.

5. An electric discharge device comprising in combination a container, electrodes therein, a filling of magnesium vapor therein, the surface of the container exposed to the magnesium vapor comprising a glass made of boric acid, silicic acid, and a suitable base, the silicic acid being not substantially greater than 50% of the mixture.

6. An electric discharge device comprising a container, electrodes therein, a filling of magnesium vapor therein, the surface of the container exposed to the magnesium vapor comprising a glass made of not to exceed substantially 50% of silicic acid, 30% of boric acid and a suitable glass base such as alkali, alkali earth, and aluminium oxide.

7. An electric discharge device comprising a container, electrodes therein, a filling of magnesium vapor therein, the surface of the container exposed to the magnesium vapor comprising a glass made of from substantially 10 to 26% of silicic acid, substantially 40 to 60% of boric acid, substantially 11 to 13% of aluminium oxide and substantially 14 to 16% of suitable glass constituents such as alkali and alkali earth.

GEORG GAIDIES.
MARTIN REGER.